United States Patent
Groen et al.

(10) Patent No.: US 9,643,653 B2
(45) Date of Patent: May 9, 2017

(54) ATTACHMENT OF A FRONT END OF A MOTOR VEHICLE TO A SUBFRAME OF THE MOTOR VEHICLE

(71) Applicant: AUDI AG, Ingolstadt (DE)

(72) Inventors: Matthias Groen, Ingolstadt (DE); Joachim Schmitt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/104,130

(22) PCT Filed: Dec. 6, 2014

(86) PCT No.: PCT/EP2014/003276
§ 371 (c)(1),
(2) Date: Jun. 13, 2016

(87) PCT Pub. No.: WO2015/086139
PCT Pub. Date: Jun. 18, 2015

(65) Prior Publication Data
US 2016/0311468 A1      Oct. 27, 2016

(30) Foreign Application Priority Data
Dec. 14, 2013   (DE) ........................ 10 2013 021 344

(51) Int. Cl.
*B62D 21/11*    (2006.01)
*B62D 21/15*    (2006.01)
(52) U.S. Cl.
CPC ............ *B62D 21/152* (2013.01); *B62D 21/11* (2013.01); *B62D 21/155* (2013.01)

(58) Field of Classification Search
CPC .. B62D 21/11; B62D 21/155; B60G 2204/15; B60G 2206/60
(Continued)

(56) References Cited

U.S. PATENT DOCUMENTS 5,884,963 A *   3/1999   Esposito ................ B62D 21/09
                                                    280/784
9,108,482 B2    8/2015   Mohrlock et al.
(Continued)

FOREIGN PATENT DOCUMENTS

DE       EP 0 926 048 A2    6/1999
DE    10 2006 023 051 A1    1/2008
(Continued)

OTHER PUBLICATIONS

International Search Report issued by the European Patent Office in International Application PCT/EP2014/003276.

*Primary Examiner* — Faye M Fleming
(74) *Attorney, Agent, or Firm* — Henry M. Feiereisen LLC

(57) ABSTRACT

An attachment of a front end of a motor vehicle to a subframe of the motor vehicle, includes an adjustment device arranged between the front end and the subframe, as viewed in the motor vehicle longitudinal direction, to attach the front end to the subframe. The adjustment device has a front-end-side and a subframe-side adjusting unit, and is configured such that the adjustment device can be shortened, as viewed in the motor vehicle longitudinal direction, in the event of a correspondingly high force impact caused by accident. The subframe-side adjusting unit of the adjustment device is arranged on a housing mounted to the subframe.

7 Claims, 1 Drawing Sheet

(58) Field of Classification Search
USPC .................................................. 280/124.109
See application file for complete search history.

(56) References Cited

U.S. PATENT DOCUMENTS

| | | | |
|---|---|---|---|
| 9,205,874 | B2 | 12/2015 | Schindler et al. |
| 9,321,323 | B2 | 4/2016 | Schindler et al. |
| 9,446,795 | B2 * | 9/2016 | Jung .................... B62D 21/155 |
| 2011/0025035 | A1 | 2/2011 | Beuss et al. |
| 2013/0256051 | A1 | 10/2013 | Nakamura et al. |
| 2014/0046502 | A1 | 2/2014 | Schmitt |
| 2016/0121687 | A1 * | 5/2016 | Reusser ................ B62D 61/06 |
| | | | 280/62 |

FOREIGN PATENT DOCUMENTS

| | | |
|---|---|---|
| DE | 10 2008 039 138 A1 | 3/2009 |
| DE | 10 2009 052 877 A1 | 5/2011 |
| DE | 10 2009 055 697 A1 | 6/2011 |
| DE | EP 2 380 782 A1 | 10/2011 |
| DE | 10 2011 108 322 A1 | 1/2013 |
| DE | 10 2013 005 603 A1 | 11/2013 |
| DE | 10 2012 011 424 A1 | 12/2013 |

* cited by examiner

ATTACHMENT OF A FRONT END OF A MOTOR VEHICLE TO A SUBFRAME OF THE MOTOR VEHICLE

CROSS-REFERENCES TO RELATED APPLICATIONS

This application is the U.S. National Stage of International Application No. PCT/EP2014/003276, filed December 6, 2014, which designated the United States and has been published as International Publication No. WO 2015/086139 and which claims the priority of German Patent Application, Ser. No. 10 2013 021 334.4, filed December 14, 2013, pursuant to 35 U.S.C. 119(a)-(d).

BACKGROUND OF THE INVENTION

The invention relates to an attachment of a front end of a motor vehicle to a subframe of the motor vehicle according to the type set forth in the preamble of patent claim 1.

DE 10 20:06 023 051 A1 discloses a front end of a motor vehicle, which is supported by flexible connecting points on a strut assembly and includes guide members along which the front end is to be moved back after the connecting points yield in the event of a correspondingly high force impact caused by accident. The guide members are hereby formed by struts of the front end, which cooperate telescopically with corresponding support struts of the strut assembly.

SUMMARY OF THE INVENTION

The invention is based on the object to refine an attachment of a front end of a motor vehicle to a subframe of the motor vehicle according to the type set forth in the preamble of patent claim 1 such that modifications to the wheel suspension can be realized without further modifications to the front-end structure.

This object is achieved by an attachment of a front end of a motor vehicle to a subframe of the motor vehicle, wherein the front end is attached to the subframe by an adjustment device arranged between front end and subframe, as viewed in the motor vehicle longitudinal direction, with the adjustment device having a front-end-side and a subframe-side adjusting unit, and with the adjustment device being configured such that the adjustment device can be shortened, as viewed in the motor vehicle longitudinal direction, in the event of a correspondingly high force impact caused by accident, wherein the subframe-side adjusting unit of the adjustment device is arranged on a housing mounted to the subframe.

The subclaims provide advantageous refinements of the invention.

In known manner, the front end of a motor vehicle is attached to the subframe of a motor vehicle via an adjustment device which is arranged and effective between front end and subframe, when viewed in motor vehicle longitudinal direction. The adjustment device, in turn, includes a front-end-side adjusting unit and a subframe-side adjusting unit and is configured such that the adjustment device can be shortened, as viewed in motor vehicle longitudinal direction, in the event of a correspondingly high force impact caused by accident.

According to the invention, the subframe-side adjusting unit of the adjustment device is arranged on a housing mounted to the subframe.

The configuration according to the invention proves to be particularly advantageous, since the subframe-side adjusting unit of the adjustment device is now disposed on the housing, so that the housing provides sufficient space at the subframe in order to install the components necessary for a modification of the wheel suspension. Additional modifications to the front-end structure, in particular a modification to the front-end attachment, are thus no longer necessary.

In order to enable retrofitting of respective subframe constructions having a housing, provision is made in accordance with a first embodiment of the invention to secure the subframe-side adjusting unit of the adjustment device on the housing via an interference fit and/or material joint.

According to another embodiment of the invention, the subframe-side adjusting unit of the adjustment device is integrated in the housing or adjustment device and housing form a unitary structure. As a result, a particularly compact design is ensured in an advantageous manner.

Preferably, the housing is hereby secured detachably to the subframe cast node via screw connections. This ensures quick assembly/disassembly of the housing.

According to a particularly advantageous embodiment of the invention, the components of an active stabilizer, necessary on each vehicle side, are arranged in the housing. This involves, e.g., two rotary actuators and a respective control unit for controlling the rotary actuator. This embodiment proves to be particularly advantageous, since a body stabilization system can now be integrated, without requiring further modifications to the conventional front-end structures.

BRIEF DESCRIPTION OF THE DRAWING

Further advantages, features and applications of the present invention will become apparent from the following description in combination with the exemplary embodiment shown in the drawing.

In the description, in the claims, and in the drawing, the terms used in the below list of reference signs and associated reference signs are used.

The drawing shows in:

Figure 1:
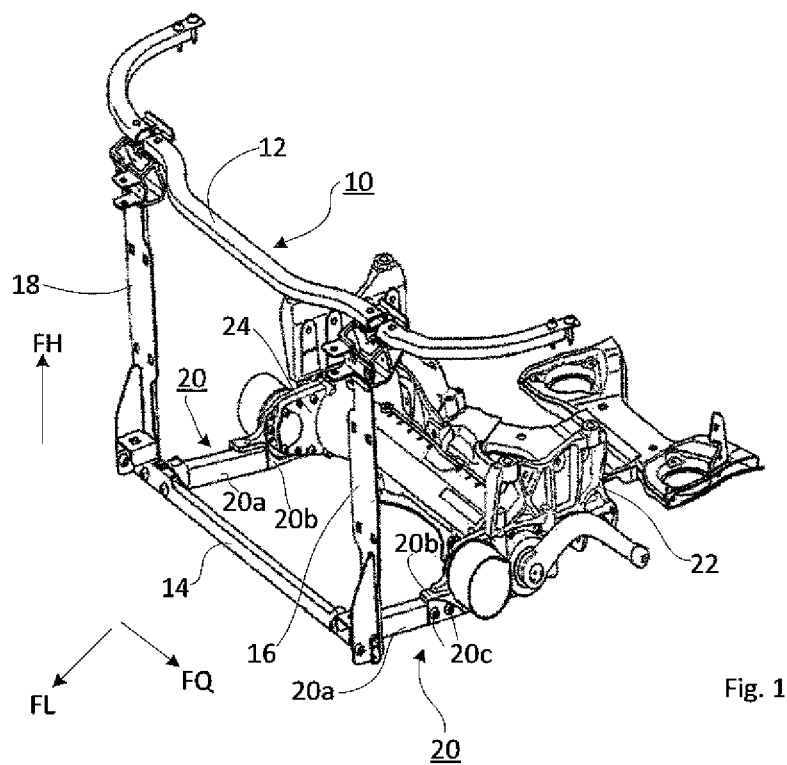
Figure 2:
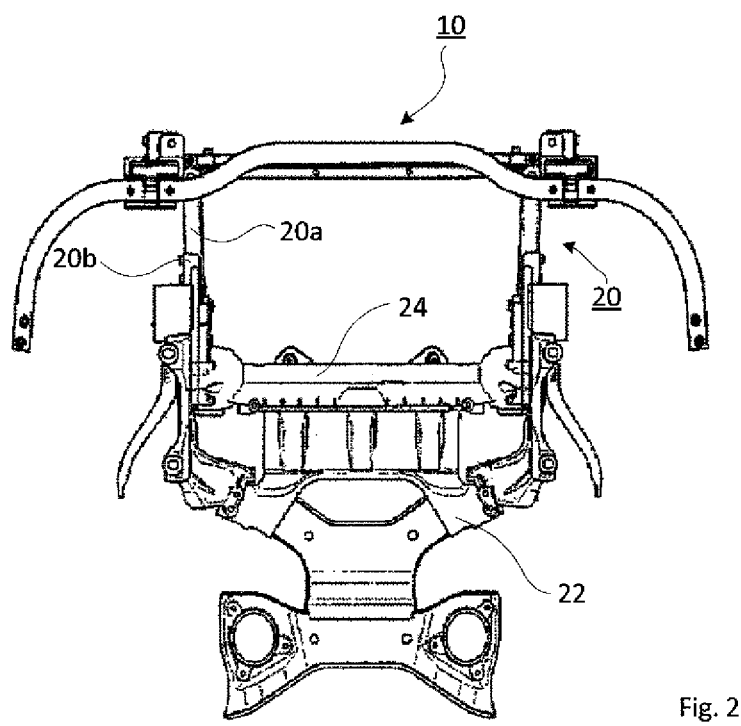

FIG. 1 an attachment in accordance with the invention of a front end of a motor vehicle to a subframe by way of a view obliquely from above, and FIG. 2 a top view of the attachment of FIG. 1.

DETAILED DESCRIPTION OF PREFERRED EMBODIMENTS

FIG. 1 shows a front end of a motor vehicle, generally designated by reference sign 10. The front end 10 is formed here in the shape of a frame and has two crossbar elements 12, 14, oriented in vehicle transverse direction FQ, and two strut elements 16, 18, extending in motor vehicle vertical direction FH.

In the area of the connecting points of the struts 16, 18 with the lower crossbar element 14, the front end 10 is attached to a subframe 22 via an adjustment device, generally designated by reference sign 20.

The adjustment device 20 includes hereby an adjusting unit 20a, which faces the front end 10 —referred hereinafter as front-end-side adjusting unit—, and an adjusting unit 20b, which faces the subframe 22—referred hereinafter as subframe-side adjusting unit.

As further shown in FIG. 1, the front-end-side adjusting unit 20a is telescopically configured for movement into the subframe-side adjusting unit 20b. A pin connection 20c between the two adjusting units 20a, 20b ensures that the front-end-side adjusting unit 20a plunges into the subframe-side adjusting unit 20b only in the event of an accident that produces a correspondingly high force impact, so that the adjustment device 20 causes a shortening in motor vehicle longitudinal direction FL.

While the front-end-side adjusting unit 20a is respectively secured to the front end 10 in the region of the connection points of the struts 16 and 18, respectively, with the lower crossbar element 14, the respective subframe-side adjusting units 20b, which oppose one another in vehicle longitudinal direction FL, are arranged on a housing 24.

The housing 24 involves here is a housing in which the components such as rotary actuator and control unit, necessary for an active stabilization system, are integrated and which, in turn, is detachably secured to the subframe 22 via screw connections.

Since in accordance with the invention the subframe-side adjusting units 20b of the adjustment device 20 are now arranged on the housing 24, it is ensured in an advantageous manner that a simple modification of the wheel suspension is possible without modification of the entire front-end concept.

What is claimed is:

1. An attachment of a front end of a motor vehicle to a subframe of the motor vehicle, comprising:
   a housing mounted to the subframe; and
   an adjustment device arranged between the front end and the subframe in a motor vehicle longitudinal direction to attach the front end to the subframe, said adjustment device including a front-end-side adjusting unit and a subframe-side adjusting unit, said adjustment device being configured to shorten in the motor vehicle longitudinal direction in response to a sufficient force impact, said subframe-side adjusting unit of the adjustment device being arranged on the housing.

2. The attachment of claim 1, wherein the subframe-side adjusting unit of the adjustment device is secured to the housing by interference fit and/or material joint.

3. The attachment of claim 1, wherein the subframe-side adjusting unit of the adjustment device is integrated in the housing.

4. The attachment of claim 1, wherein the housing is secured detachably to subframe cast nodes via screw connections.

5. The attachment of claim 1, wherein the housing is configured to accommodate components of an active stabilizer on each side of the motor vehicle.

6. The attachment of claim 5, wherein the housing is configured to accommodate two rotary actuators and a control unit.

7. The attachment of claim 1, wherein the front-end-side adjusting unit and the subframe-side adjusting unit are configured for telescoping into one another to thereby shorten the adjustment device, and further comprising a pin connection to connect the front-end-side adjusting unit and the subframe-side adjusting unit to one another, said pin connection being configured to allow the front-end-side adjusting unit to plunge into the subframe-side adjusting unit in response to the force impact.

* * * * *